June 1, 1965  R. A. WOLPERT  3,186,101

BUBBLE LEVEL CAP FINAL FIGURING

Filed Nov. 22, 1960

*INVENTOR.*
RAYMOND A. WOLPERT

BY Allan Rothenberg

ATTORNEY

United States Patent Office 3,186,101
Patented June 1, 1965

3,186,101
BUBBLE LEVEL CAP FINAL FIGURING
Raymond A. Wolpert, Long Beach, Calif., assignor to North American Aviation, Inc.
Filed Nov. 22, 1960, Ser. No. 71,007
9 Claims. (Cl. 33—212)

This invention relates to an improved bubble level and more specifically relates to the cap which provides the radius of curvature or sensitivity of such level and methods of forming such cap.

In the pre-launch alignment of an inertial guidance system for a vehicle such as an automatic missile, it is highly desirable to accurately determine the attitude of the guidance instrument platform relative to the local apparent vertical. For this purpose, a highly accurate bubble level may be employed, the positional displacement of the bubble in which being indicative of the local apparent vertical. Current precision bubble level devices for such purposes enable direct measurement of such displacement to provide an electrical signal which is a function of the angular displacement of the level.

In general, such direct electrical measuring means involve a bubble level having a chamber containing an electrolyte fluid which incompletely fills the chamber to provide a bubble. The device contains at least one pair of spaced electrodes in the curved upper surface of the chamber and a single electrode in the center of the lower surface of the chamber. The conductive paths through the electrolyte from the single electrode to each of the pair of electrodes are utilized as resistances in a bridge circuit. When the device is level, the bubble bisects the distance between the pair of electrodes and balances the bridge. Movement of the bubble across the electrodes as the angular position of the level varies, changes the condition of the bridge and provides an output signal which is a function of the level displacement.

The sensitivity of the device is determined in part by the radius of curvature of the upper surface of the chamber. The precise relationship between the bridge output signal and the angular displacement of the level is determined in part by the precise shape of the upper surface of the chamber, being desirably linear for a constant radius of curvature. Therefore, the amount by which the level is angularly displaced can be precisely determined as a linear function of the output signal if the upper surface of the chamber is precisely generated with a specific radius of curvature.

To determine the inclination of a plane as distinguished from the inclination of a line, measurements are required of two mutually orthogonal lines lying in the plane sought to be measured. A level of the type described and capable of making such measurements would employ an upper surface or cap for the fluid chamber of substantially spherical configuration, and containing two pairs of electrodes, co-planar and of which the electrodes of each pair are spaced along lines which are mutually orthogonal in the common plane, and employing a separate bridge circuit for each such pair.

Inertial guidance system applications require degrees of precision not found in other applications of this or analogous arts. Precise linear operation of the levels described requires that the combination of cap material and pairs of electrodes together form a precise spherical surface for the upper surface of the level chamber containing the bubble and electrolyte fluid. Such surface will necessarily consist of the cap material containing the electrode material imbedded therein. A precision configuration involves shaping this combination of materials to a radius of curvature which is held to a tolerance of within plus or minus several micro-inches.

The material selected for the cap must demonstrate certain properties including the following: chemical inertness to electrolytes contained in the level chamber, electrical insulating properties relative to the electrodes, geometric stability and the capability of being formed, ground or lapped to high precision tolerances. Hence, a material suitably employed is optical glass or the like.

The material selected for the electrodes must demonstrate the properties of: chemical inertness to the electrolytes employed in the level chamber, low-electrical resistivity relative to the electrolyte, and the capability of being formed to high precision tolerances. Hence, a material commonly employed is platinum or the like.

The problem, in seeking to generate a precision surface upon the face of a glass blank containing platinum imbedded therein and extending to the face thereof, is caused by the difference in response of the metal or platinum surface portion to the forming tool relative to the response of the glass portion of such surface. Where usual optical glass grinding procedures are employed, the surface consisting of a series of surface portions each of one of two different materials, platinum and glass, refuses to grind or shape evenly. An attempt to generate a concave spherical surface by classical optical glass grinding and polishing methods will leave the glass in the desired shape. However, the metal inserts imbedded in the glass piece will refuse to respond, and will remain protruding from or convex to the desired curvature.

By way of explaining the present invention, it will be described as a method of manufacturing a glass cap shaped to a desired curved curvature, the shaped face of which contains metallic electrode inserts. The principles of the invention are described with reference to such a method which comprises the steps of generating a precise surface upon a glass blank containing the metallic inserts with the inserts remaining slightly protruding from such surface, grinding the metal inserts, and finally burnishing the metal inserts to within the desired tolerance with little or no effect upon the glass surface.

Therefore, an object of this invention is to provide a precision surface having at least two areas of differing hardness.

A further object of this invention is to provide a method of producing a precision surface shape upon a glass body containing metallic electrodes terminating upon the surface to be generated.

Another object of this invention is to provide an inexpensive method of manufacturing a precision glass surface containing metallic electrode surface areas, which employs a minimum of skill and special equipment.

Yet a further object of this invention is to provide a reliable method of consistently producing a precision surface upon a glass body containing metallic electrodes within said surface, whereby workpiece rejection rates and scrappage are reduced.

These and other objects of this invention will become apparent from the following specifications when taken with the accompanying drawings in which FIG. 1 is a vertical center section through a bubble level assembly, showing a cap in place and with the desired form;

In the drawings, like numbers refer to like parts.

Figure 1:
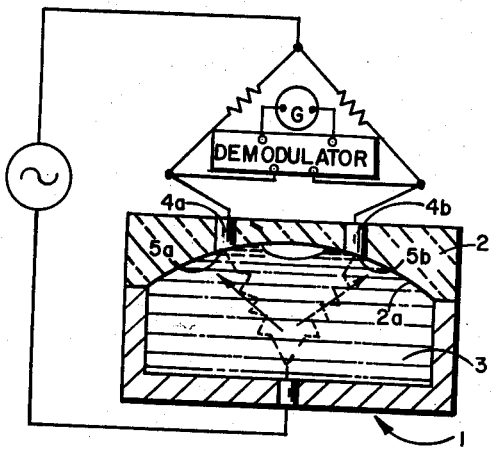

Referring now to the drawings for a more detailed understanding of the invention, in FIG. 1 is depicted a bubble level assembly 1, showing a cap 2 in place and constituting the upper surface 2a of a bubble level chamber 3. The cap, as shown, contains a pair of metallic electrode inserts 4a and 4b for a single sensitive axis and having terminal surfaces 5a and 5b. The pair of electrodes of a second sensitive axis are not shown in this sectional view. The upper surface 2a, as shown, including the terminal surface of each of the electrodes, is preferably spherical when the method of applicant's invention is employed.

Figure 2:
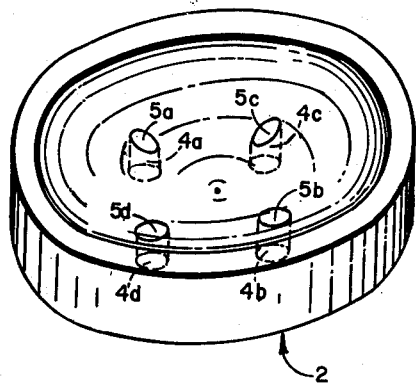
FIG. 2 is a view of the underside of a spherical cap for a two-axis level.

In FIG. 2 is depicted the glass cap for a two-axis level, illustrating the interruption of the spherical glass surface 2a with the terminal surfaces 5a, 5b, 5c, and 5d of the two pairs of electrode inserts, 4a, 4b, 4c, and 4d, each pair mounted on a line mutually orthogonal with the other, as to define a quadrature relation between the four inserts.

The cap containing the metallic inserts comprises a high quality optical glass capable of being formed to micro-inch tolerances, and having a temperature coefficient of expansion similar to that of the electrode inserts. The electrode inserts should preferably consist of an iridium alloy of platinum in the ratio of 95 percent platinum–5 percent iridium by weight. The purpose of the small percentage of iridium present is to improve the working features or shaping qualities of the platinum, and to reduce the tendency of the platinum to smear or to peel-off in irregular microscopic shavings (which represents a limitation on the tolerances to which such material can be formed). An optical glass having a temperature co-efficient of expansion similar to that of platinum is a dense flint glass such as Hayward DF–2 or the like.

The cap containing the electrode inserts is received first as a round flat blank, the opposite faces of which are mutually parallel. In the method or process of manufacturing the bubble level cap, the cap 2 is first shaped. In shaping the desired curve in the cap, sphericity is achieved by an approach used for grinding or shaping optical glass. This approach consists of using in sequence each of a series of convex curves or tools by which to shape the cap. These tools are iron tools of the same general curvature convexly as the concave curve sought to be shaped in the flat blank, and employ a sequence of a series of grinding compounds such as silicon carbides, aloxites, and garnets, in the sequence and order named. Each step requiring the use of a particular grinding compound, itself consists of a sequence of steps employing successively finer meshes or grains of that particular compound, with washing of the workpiece afterward and prior to the performance of the next step.

For instance, the silicon carbide step would include the four steps of 180 screen mesh silicon carbide, 1F or 100 fine screen, 3F or 300 fine screen, and 6F or 600 fine screen. The aloxite step would include at least one step starting with 9.5 micron grain size. The garnets would include at least one step employing W–10 garnet and perhaps a second step with W–12 garnet. This general classical optical glass approach is used in shaping a glass blank containing metallic electrodes because of its speed and efficiency. The general process itself is described generally on page 349 of The Principles of Optics, Mc-Graw-Hill (1932) and is described in no further detail herein, being well known in the art. If, however, finer shaping is yet desired, black india ink may be used as a grinding compound in a further step in such shaping sequence.

Figure 3:
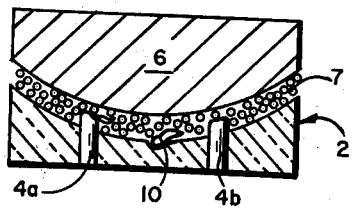
FIG. 3 is a center section taken upon lines A—A of FIG. 2, normal to the spherical surface and through a pair of metal inserts.

Referring to FIG. 3, there is depicted the glass cap 2 in an inverted position under an iron tool 6, and a grinding compound 7 disposed between the adjacent surfaces of the tool 6 and cap 2, illustrating that the response of terminal area 5a and 5b of the inserts results in a shape convex to the glass area of the surface 2a. The reason that the glass area readily responds to the grinding compounds relative to the platinum inserts or that the platinum inserts 4a and 4b fail to respond to the degree that the glass area responds is due to the differences in both hardness and resilience between the two substances. The relative hardness of the glass surface causes it to be subjected to the conchoidal fractures incurred in breaking down the crystalline structure of the glass surface by means of the grinding compounds. These conchoidal fractures of chips 10 may be many times larger than the grain size of the grinding compounds 7 producing such conchoidal fractures. The platinum inserts, on the other hand, are not only not as hard as the glass as to be subject to such process in the same degree, but further demonstrate the property of greater resilience or compliance relative to the glass. Thus, the effect of the forceful application of the grinding compound to the platinum inserts is to cause the insert to somewhat deform elastically while being incidentally ground or polished away. Upon removal of the force by which the compound is applied to the face or surface being polished, the elastically deformed platinum insert resumes its original shape less whatever incidental polishing has occurred, and appears as a high spot relative to the unyielding polished glass.

The glass cap having been shaped to the desired curvature and within the desired tolerance, whereby the platinum electrodes are somewhat convex to the desired surface, final figuring of the surface is performed next. Figuring is defined on page 51, Procedures in Experimental Physics, Prentice-Hall, Inc. (1938), as the process whereby a polished surface has its shape altered by local working with polishing tools.

In the instant situation, the shape to be altered is that of the platinum inserts with little or no effect upon the glass surface. Testing is alternated with local polishing on those areas (the platinum inserts) which are high in reference to a desired surface (that of the glass). The figuring procedure comprises testing the imperfect surface and working it with a suitable tool whose cutting zones will tend to cancel the high spots or zones revealed by the testing. It has been discovered that a solid aloxite tool provides a means of accurately working or grinding the high spot or zone formed by the convex shape of the platinum electrode insert. The action of the solid aloxite tool provides a severe planing or tearing action to remove surplus metal smears or chips, with little or no effect upon the glass area. As a consequence, while the metal surface approaches that of the glass cap, it is also uneven and rough, relative to the desired surface finish. Therefore, the slightly protruding surfaces of the platinum electrode surfaces are next finished by burnishing with a glass tool, all with little or no effect upon the glass surface. The glass burnishing tool is similarly shaped as the above described iron and aloxite tools.

The process of burnishing the surfaces of the metallic electrodes is defined on pages 768 and 769 of Materials and Processes, Second Edition, John Wiley and Sons (1954), as a type of cold-working metal forming process, performed under temperatures below that required for recrystallization of the metal workpiece and resembling a smooth, polishing operation accomplished by compression and/or friction. The use of a particularly hard tool under pressure tends to close the surface pores of the metal workpiece, resulting in a tighter surface.

Figure 4:
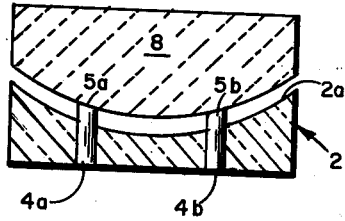
FIG. 4 is a center section similar to FIG. 3 and showing a solid aloxite tool in place for working the cap.

As is illustrated in FIG. 4, the solid aloxite tool 8 little affects the glass surface, relative to the effect produced by the aloxite grinding compounds employed in the optical grinding technique, because of the decreased surface contact effected between the solid wheel and the glass surface. The aloxite grinding compounds 7 in FIG. 3, on the other hand, are in continuous contact with the glass surface upon the application of force to the iron tool 6. A further explanation of the lack of effect the solid aloxite tool displays upon the glass surface relative to the effect upon the protruding platinum inserts is that the force applied to the stone represents a greater pressure upon the small supporting area presented by the protruding inserts, the grinding effect upon a surface being a function of the pressure applied normal to the surface. The glass tool used in the burnishing process and substituted for element 8 in FIG. 4 little effects the glass area of the cap surface for like reasons plus the further reason of the similar nature of the surfaces of the glass cap and glass burnishing tool. It is to be understood that the amount of electrode protrusions, the size of grinding compound particles, and the like as illustrated in the drawings are greatly exaggerated for purposes of exposition. The actual amount of protrusion of electrodes remaining prior to final figuring is on the order of 100 micro-inches or so.

In the use of the solid aloxite tool to figure the platinum inserts, care should be used to avoid charging the tool with platinum resulting from the action of the tool upon the inserts. If such care is not taken, figuring of the electrode surfaces will not be true, and asymmetries will appear in the electrical bridge circuit measurements associated with use of the bubble level. If inspection during final figuring indicates that the tool has become so charged, the tool may be cleansed simply by means of a rubber eraser.

Employing the above procedures, applicant has manufactured bubble level caps, of the materials described and having a face of one inch diameter, to a radius of curvature of twelve inches within a tolerance of plus or minus five micro-inches.

Thus, by the methods of this invention is provided an improved means for achieving a precise curvature upon a surface comprised of at least two areas, one of said areas being of a hardness different than the other.

Although the invention has been described and illustrated in detail, it is clearly understood that the same is by way of illustration and example only and is not to be taken by way of limitation, the spirit and scope of this invention being limited only by the terms of the appended claims.

I claim:

1. A process for forming a curved surface having at least two areas of different hardness and resilience, one being a hard non-resilient electrically non-conductive material and the other being of a resilient less hard, electrically conductive metal, comprising the steps of shaping said surface utilizing a grinding compound and a shaping tool until the harder of said surfaces assumes the desired curvature, whereby said softer area is elastically deformed and not shaped to said curvature; grinding said softer area to within 100 micro-inches of the desired curvature; and then burnishing said softer area by means of a burnishing tool of a material of like hardness as said harder surface.

2. A process for manufacturing a surface having at least two areas, one of which is glass and another of which is platinum comprising the steps of shaping said surface utilizing a series of optical glass grinding compounds and an iron shaping tool until the glass assumes the desired curvature to within a tolerance of less than 10 micro-inches, whereby said platinum area is not shaped to said curvature; grinding said platinum area to within 100 micro-inches of the curvature by means of a solid aloxite grinding wheel; and then burnishing said platinum area.

3. A process for shaping and final figuring of a hard non-resilient surface containing soft resilient metal inserts therein, comprised of the steps of shaping the surface by classical optical shaping technique until the hard surface assumes a desired curvature with said inserts being convex to such curvature; grinding said inserts from said convex shape down to within 100 micro-inches of said desired curvature by means of a solid aloxite tool; and then burnishing said inserts by means of a glass burnishing tool.

4. The method of final figuring a hard and non-resilient surface of desired curvature and containing soft and resilient metal inserts therein convex to such curvature comprising grinding said inserts from said convex shape down to within 100 micro-inches of such surface by means of a solid aloxite tool and then burnishing said inserts to the desired configuration by means of a burnishing tool of a like hardness as said hard surface.

5. A processing for shaping and final figuring of a non-resilient glass surface blank containing resilient metallic inserts therein having a hardness less than that of said glass surface, comprising the steps of shaping the surface by classical optical shaping process until the glass surface assumes a desired curvature whereby said inserts are elastically deformed and convex to such curvature; grinding said inserts from said convex shape down to within 100 micro-inches of said surface by means of a solid aloxite tool; and then burnishing said inserts by means of a glass burnishing tool.

6. A process for final figuring a glass surface of desired curvature and containing resilient metallic inserts therein having a hardness less than that of said glass and being convex to the curvature of the glass, comprising the steps of grinding said inserts from said convex shape down to within 100 micro-inches of said surface, and then burnishing said inserts with a glass burnishing tool.

7. In the manufacture of a precision bubble level, a process for shaping and final figuring of a Hayward dense flint–2 type glass surface containing platinum inserts therein, said inserts formed of an iridium alloy of platinum comprising the steps of: shaping said glass by a classical optical shaping process until the glass surface assumes a desired curvature, whereby said inserts are elastically deformed and convex to said curvature; grinding down said inserts to within less than 10 micro-inches of said glass surface by means of a solid aloxite tool; and then burnishing said inserts by means of a glass burnishing tool.

8. The method of final figuring a precision electrolytic bubble level cap to within micro-inch tolerances of a spherical shape, said cap including a glass surface of Hayward dense flint–2, or the like, having metallic electrodes protruding therefrom, said electrodes comprising an iridium alloy of platinum in the proportion of 95 percent platinum to 5 percent iridium, comprising the steps of grinding said electrodes without substantially affecting the configuration of the glass by moving a solid aloxite tool across said surface and burnishing said electrodes without substantially affecting the configuration of the glass by moving a glass burnishing tool across said surface to bring the configuration and protrusion of the electrode to within the required tolerances.

9. A bubble level including a fluid-containing body having a curved glass cap on the body having a number of metallic electrodes therein extending to the inner surface of said cap, said metallic electrodes being an iridium alloy of platinum in the proportion of 95% platinum and 5% iridium and said glass cap being of Hayward dense flint–2 type glass, said inner surface together with said electrodes being shaped to requisite configuration within requisite tolerances by a method including initial shaping of said glass surface, grinding protrusions of the electrodes from the surfaces with a solid aloxite tool to within 100 micro-inches of said glass surface and burnishing the remaining protrusion of the metallic electrodes with a glass burnishing tool.

References Cited by the Examiner

UNITED STATES PATENTS

| | | | |
|---|---|---|---|
| 147,536 | 2/74 | Whitney. | |
| 2,387,313 | 10/45 | Wilson | 33—206.5 |
| 2,414,449 | 1/47 | Chapin | 33—206.5 |
| 2,704,010 | 3/55 | Lantz et al. | 51—284 X |

ISAAC LISANN, *Primary Examiner.*

S. FEINBERG, *Examiner.*